Oct. 4, 1966    E. E. McCOWN    3,277,469

MOVING TARGET INDICATOR GENERATOR

Filed Oct. 12, 1964

INVENTOR.
EVERETT E. McCOWN

BY

ATTORNEYS

United States Patent Office 3,277,469
Patented Oct. 4, 1966

3,277,469
MOVING TARGET INDICATOR GENERATOR
Everett E. McCown, San Diego, Calif., assignor to the United States of America as represented by the Secretary of the Navy
Filed Oct. 12, 1964, Ser. No. 403,418
2 Claims. (Cl. 343—7.7)

This invention described herein may be manufactured and used by or for the Government of the United States of America for governmental purposes without the payment of any royalties thereon or therefor.

The present invention relates to moving target indication MTI radar systems and more particularly, to a radar MTI generator for eliminating stationary targets from a radar display.

Many attempts have been made to provide a practical MTI radar system and in fact, there are several MTI systems presently in use. However, the presently operating MTI systems have several features in common which are disadvantageous i.e. there are bulky space requirements, great expense and a requirement for continuous maintenance and adjustment. The greatest drawback is the requirement for an extremely stable radar PRF (pulse repetition frequency).

An object of the present invention is to provide a practical, simple, low cost MTI system.

Another object of the present invention is to provide an MTI processor for eliminating stationary targets from a radar display.

A further object of the present invention is to provide a radar MTI generator utilizing an electrical input, electrical output storage device which is maintenance-free, simple to operate and extremely low-cost.

Figure 1:
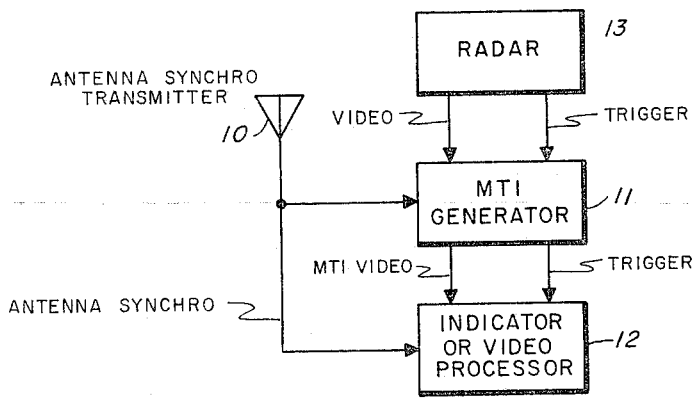
Figure 2:
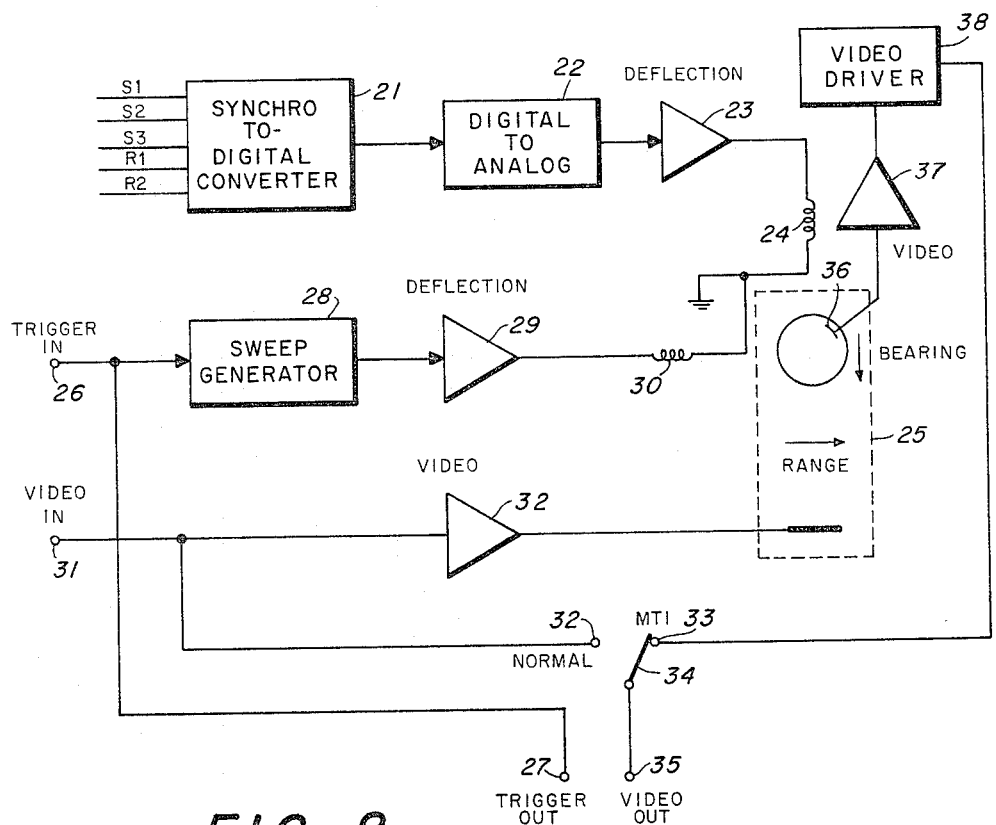

Other objects and many of the attendant advantages of this invention will be readily appreciated as the same becomes better understood by reference to the following detailed description when considered in connection with the accompanying drawings wherein:

FIG. 1 is a block diagram of the overall radar system showing the location of the MTI generator; and FIG. 2 is a representative showing of the MTI generator.

Briefly, the radar MTI generator of the present invention is an electrical-input, electrical-output storage device. Its function is to eliminate stationary targets from appearing on a radar display. This is accomplished by omitting from the output all components of the input-video signal which are repeated at intervals corresponding to the scanning frequency applied to the MTI unit. Scanned at the azimuth sweep frequency, an area MTI mode of operation is realized. This mode will store a complete radar scan and will generate MTI video by scan-to-scan raster differencing.

A storage tube is utilized and the radar information is mapped onto the storage surface of the tube in "B"-scan fashion. This provides uniform resolution for the radar information field. In that the information can be mapped onto the tube in a B-scan fashion and then mapped back on to the radar display as a PPI (plan position indicator) scan, no system complexity is introduced.

In FIG. 1 an antenna synchro transmitter 10 is utilized to provide antenna synchro information to an MTI generator 11 and indicator or video processor 12. The radar transmitter and receiver are contained within block 13 and a video output is coupled from the radar receiver to the generator 11 while a trigger output is from the radar transmitter to the MTI generator 11. Outputs are taken from the MTI generator 11, corresponding to an MTI video output which in turn corresponds to moving targets and a trigger which is coupled straight through the MTI generator to the video processor 12.

The moving target indicator is set forth in greater detail in FIG. 2 wherein synchro information is coupled in to a synchro-to-digital converter 21 which is set forth in detail in co-pending application Serial No. 403,417, filed October 12, 1964. Synchro signals $S_1$, $S_2$ and $S_3$ are coupled to the input along with reference signals $R_1$ and $R_2$. The synchro-to-digital converter functions to compare the synchro signals with the reference and determine phase and amplitude. The phase and amplitude are then converted to a digital word representative of azimuth position which is coupled to a digital-to-analog converter 22. The output of the digital-to-analog converter 22 is an analog voltage which is coupled through amplifier 23 to the deflection coil 24 of a storage tube 25.

The trigger from the radar transmitter is coupled in to input 26, straight through to an output terminal 27, which may be utilized in the PPI. The input 26 is also coupled to a sweep generator 28 and the output of the sweep generator, which is an analog voltage is coupled through an amplifier 29 to another deflection coil 30 associated with the storage tube 25.

The video input from the radar system receiver is coupled to an input 31 through a video amplifier 32 to, in the present instance, the cathode element of the storage tube 25. The video input is also coupled to a fixed switch contact 32 of a switch 34. Another fixed contact 33 is provided corresponding to an MTI output and a moveable portion of the switch 34 is coupled to an output 35. Therefore, the output at 35 may either be an MTI output or a normal video output.

A monitor element 36 is provided for monitoring the beam current in the storage tube 25 and this output is coupled through a video amplifier 37 and video driver 38 to the MTI switch position 33.

The MTI tube used is a one inch electrical-input, electrical-output storage tube which is commercially available. Its storage time is controlled by the amount of light incident upon the nesa-coated surface. This surface is backed (toward the cathode) with a dielectric material which has the ability to assume a charge proportional to the potential energy of the electronic beam impinging upon it.

Focusing the deflection of the electron beam is accomplished magnetically. In FIG. 2, deflection in the horizontal plane represents range while azimuth is scanned vertically, generating a typical "B" type raster.

Video information is applied to the cathode of the MTI tube 25 from the video amplifier 32. These signals vary the potential energy of the electron beam leaving the cathode. This beam, after it leaves the gun and deflection system, impinges upon the storage surface of the tube leaving a charge deposited on the dielectric. Hence, this charge is proportional to the amplitude of the video signal coupled to the cathode.

If a video pulse is applied to the cathode at a particular time corresponding to a specific range and bearing, an output-current pulse will occur. If this pulse is repeated on the next scan and on successive scans (assuming identical raster coordinance) little or no output current is produced since no charge differential exists at this dielectric element.

The ratio of the initial output and this minimum output defines the cancellation ratio.

The storage tube functions in the following manner: writing paints a charge pattern on the target electrode, on the next scan, i.e. writing again, where a pattern has been written previously no beam current is drawn. The pick-off 36 monitors the beam current and the changing current provides an MTI output which may be coupled to a conventional PPI or other device.

In the radar system there is no synchronization between the "main bang" (the transmitted pulse) and the progress of the antenna azimuth. Therefore, one complete radar scan is not necessarily congruent with the previous scan. Each range sweep will occur at a bearing angle slightly different than that of the corresponding range sweep of the last scan. When this condition exists, meaningless difference information generated. Therefore, no correlation exists between the scan-to-scan raster differencing and the difference signals generated by non-stationary targets. The synchronizing problem was eliminated in the MTI generator of FIG. 2 by arbitrarily assigning each range sweep to an azimuth bin on the MTI tube 25. 1024 azimuth bins were utilized. An approximate correspondence exists between the assigned bin and the azimuth of the antenna. The quantized bearing information is obtained by the synchro-to-digital conversion (using a digital stepping motor) in the converter 21 of the signals received from the antenna. In that digital information cannot be utilized in the deflection coil 24 the output of the converter 21, which is in digital form, is converted to an analog voltage in the digital-to-analog converter 22.

The MTI generator disclosed represents a significant improvement over previously MTI systems in the elimination of the requirement for an extremely stable radar PRF. This, in turn, means that a small space for the equipment is required and an accompanying greater economy and a more simple code of operation follows.

Obviously many modifications and variations of the present invention are possible in the light of the above teachings. It is therefore to be understood that within the scope of the appended claims the invention may be practiced otherwise than as specifically described.

What is claimed is:
1. In a moving target indication radar system including a radar transmitter and receiver and scanning antenna; the improvement comprising;
azimuth converting means adapted to receive azimuth synchro signals for an associated scanning antenna for producing digitally quantized signals representative of azimuthal disposition of said antenna; and
digital-to-analog conversion means for receiving said digitally quantized signals and producing analog outputs commensurate therewith;
storage tube means having vertical and horizontal deflection coils and having an element adapted to receive video signals;
one of said vertical and horizontal deflection coils operatively receiving the output from said digital-to-analog conversion means;
the other of said vertical and horizontal deflection coils being adapted to receive the trigger signal from an associated radar transmitter;
the storage tube element being adapted to receive input video from an associated radar receiver;
said storage means operating to generate a "B" type raster through means of beam current writing on a material which has the ability to assume a charge proportional to the potential energy of the electronic beam impinging upon it, said deflection coil which receives the output of said digital-to-analog conversion means being operative to deflect said storage tube beam in predetermined increments commensurate with the azimuthal disposition of said antenna represented in said digitally quantized signals;
monitoring means for monitoring the beam current of the storage tube means;
the monitoring means functioning to provide an output representative of moving targets.
2. A moving target indication radar system as set forth in claim 1 wherein;
said azimuth converting means includes means for comparing synchro signals to reference signals and producing digital signals representative of the relative phase and amplitude of such comparisons.

References Cited by the Examiner
UNITED STATES PATENTS
2,818,561  12/1957  Miles _____ 343—7.7

CHESTER L. JUSTUS, *Primary Examiner.*
R. D. BENNETT, *Assistant Examiner.*